United States Patent [19]
Kajiura

[11] Patent Number: 6,033,243
[45] Date of Patent: Mar. 7, 2000

[54] CARD CONNECTOR HAVING MEANS FOR AVOIDING EXCESSIVE FORCE ON COMPONENTS THEREOF

[75] Inventor: Motomu Kajiura, Tokyo, Japan

[73] Assignee: Berg Technology, Inc., Reno, Nev.

[21] Appl. No.: 09/124,469

[22] Filed: Jul. 29, 1998

[30] Foreign Application Priority Data

Jul. 31, 1997 [JP] Japan ................................. 9-206825

[51] Int. Cl.[7] ............................................. H01R 13/62
[52] U.S. Cl. ..................................... 439/159; 439/157
[58] Field of Search .............................. 439/159, 160; 361/798

[56] References Cited

U.S. PATENT DOCUMENTS

| | | | |
|---|---|---|---|
| 5,499,925 | 3/1996 | Lwee | 439/157 |
| 5,536,180 | 7/1996 | Ishida et al. | 439/159 |
| 5,558,527 | 9/1996 | Lin | 439/155 |
| 5,575,669 | 11/1996 | Lin et al. | 439/157 |
| 5,599,197 | 2/1997 | Ishida et al. | 439/159 |

*Primary Examiner*—Lincoln Donovan
*Assistant Examiner*—Michael Zarroli
*Attorney, Agent, or Firm*—Daniel J. Long; Brian J. Hamilla; M. Richard Page

[57] ABSTRACT

An ejecting mechanism-equipped card connector is provided which includes an actuator member which moves lineraly over a width direction of a slider during the opening of the slider. The actuator member is supported by at least two positions on end faces along the slide direction. A push rod is displaced inwardly by means of the actuator member to operate the ejecting mechanism in a manner so that the application of excessive unbalanced force on component parts is avoided.

8 Claims, 7 Drawing Sheets

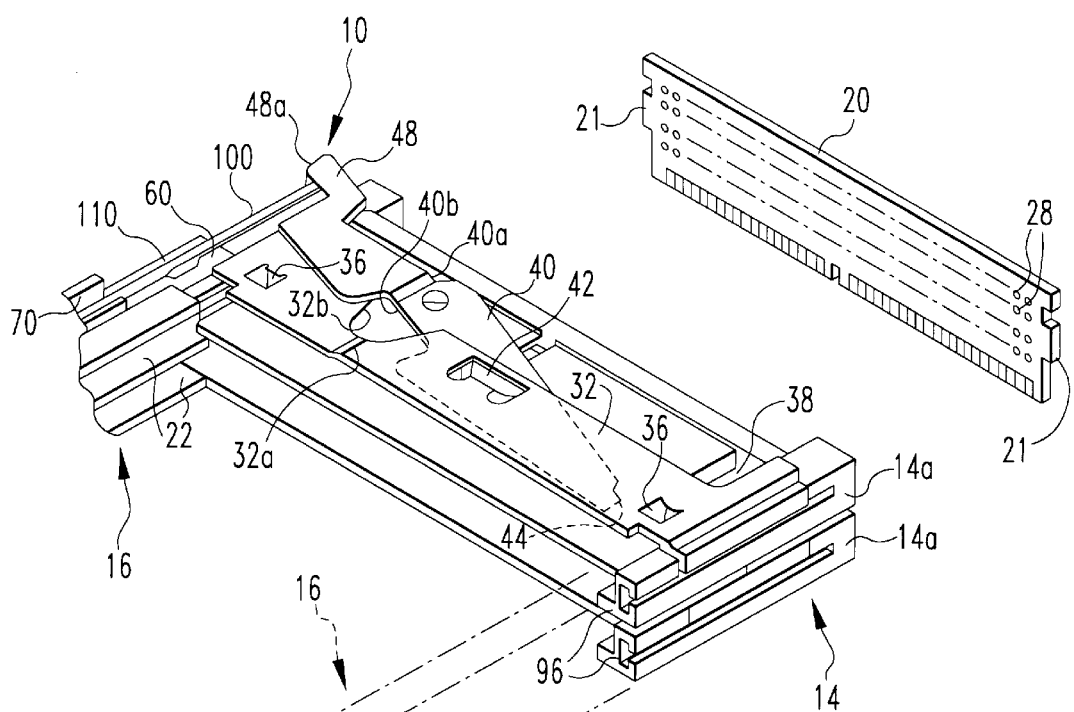
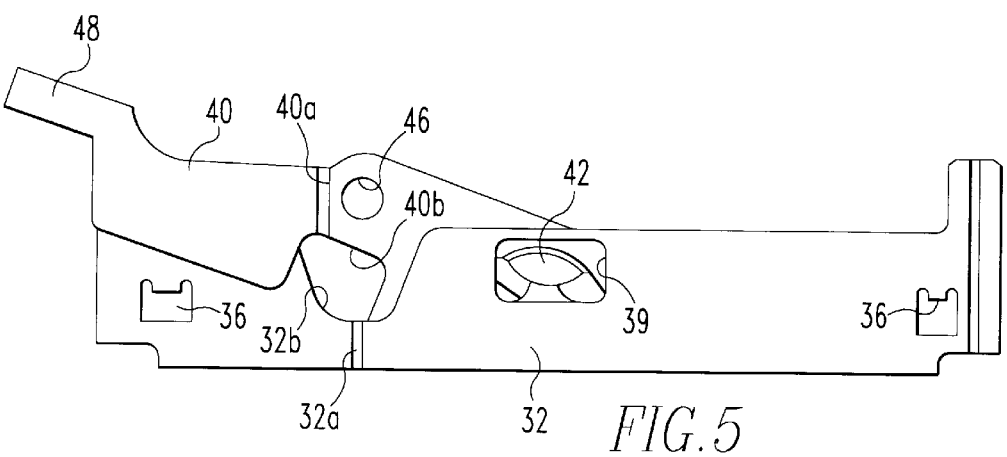

CARD CONNECTOR HAVING MEANS FOR AVOIDING EXCESSIVE FORCE ON COMPONENTS THEREOF

BACKGROUND OF THE INVENTION

1. Field of the Invention

The present invention relates to a card connector for electrically and mechanically connecting a PC card to an electronic apparatus, such as a computer and, in particular, to an ejecting mechanism-equipped card connector for PC cards.

2. Brief Description of Prior Developments

Jpn. Pat. Appln. KOKAI Publication No. 8-96891 and U.S. Pat. Nos. 5,558,527 and 5,575,669 disclose an ejecting mechanism-equipped card connector in which even with the PC card mounted therein, a push button for the withdrawal of the PC card is retained in the same position as it is in a not-mounted state; and the push button is projected only when the PC card is withdrawn.

The ejecting mechanism basically includes an operation rod having a push button at an outer end section and spring-urged outwardly, a drive rod for driving a PC card withdrawal plate through a lever, an intermediate member driven under an action of a cam and allowing a connection or disconnection to be made between an outer operation rod and an inner drive rod, and a casing for slidably guiding the operation rod and the drive rod. A substantially heart-like cam groove is formed in the bottom wall of the casing with its projecting end side outward and the recessed side inward. When a cam follower pin projected from the operation rod engages with the cam groove and the operation rod is moved, it can be moved in the cam groove in a given direction. In a normal state, the cam follower is set in the recess of the heart-like cam groove, and the operation rod is retained against the urging force of the spring. As a result, the push button is not greatly projected outside the electronic apparatus, thus preventing an operation error of the push button and not interfering with other devices.

When the PC card is to be withdrawn, the push button is lightly pushed. By means of this action, the cam follower pin is pushed out of the recess of the heartlike cam groove. Thereafter, the cam follower pin is moved under the urging force of the spring along the groove toward the projecting end side, so that the push button is greatly projected toward an outside of the electronic apparatus. At this time, the intermediate member is driven under a cam action to allow a force to be transmitted from the operation rod to the drive rod. When the greatly outwardly projected push rod is pushed, an urging force acting on the push button is transmitted from the operation rod to the drive rod through the intermediate member, thus driving the lever and the PC card withdrawal plate. As a result, together with the movement of the PC card withdrawal plate, the PC card is also moved and withdrawn out of the card connector. When an urging force acting on the push button is released after the withdrawal of the PC card, the cam follower pin of the operation rod is again retained in the recess of the heart-like cam. The intermediate member, the drive rod and the PC card withdrawal plate are freely moved without interfering with the operation rod. In the case where an urging force acting on the push button is transmitted from the operation rod to the drive rod through the intermediate member so that the lever and the PC card withdrawal plate are driven, since the operation rod and the drive rod are guided along the inner surface of the casing, it is not folded at an abutting section to the intermediate member. However, the inner surface of the casing receives a force acting on the abutting section; for this reason, a biased unbalanced force is applied to the casing. Moreover, the conventional ejecting mechanism requires more components parts because the operation rod and the drive rod are contained in the casing and guided along the inner surface of the casing together with the intermediate member. Therefore, there is a growing demand for a card connector which can answer the recent tendency of the electronic apparatuses toward its miniaturization and high-performance functioning.

SUMMARY OF THE INVENTION

The present invention has been made in view of such circumstances. It is accordingly the object of the present invention to provide an ejecting mechanism-equipped card connector which can be cheaply manufactured with a simple structure, and prevent an unbalanced force from being applied to component parts.

In order to achieve the above-mentioned objects of the present invention, there is provided a PC card connector equipped with an ejecting mechanism, comprising: a connector frame having a header section having an array of plural terminal pins connected to a PC card, and a pair of opposed arm sections extending from both side ends of the header section and guiding the side edge of PC card along an insertion/withdrawal direction of the PC card. An ejecting plate is included which has engaging sections for engaging with the PC card and guided along an insertion/withdrawal direction of the PC card. There is also a link member having a coupling section coupled to the ejecting plate so as to be swingable, a support section swingably supported at the header section in a spaced-apart position from the coupling section, and a projection extending from the support section toward an opposite side of the coupling section and projecting into side the connector frame. A push rod having an inner end section is disposed adjacent to the header section side the connector frame and an outer end section is spaced apart from the header section and adapted to receive an urging force, and is moved from an outwardly extended position in spaced relation from the header section to an inwardly pushed-in position near the header section. Means are also provided for urging the push rod toward the outwardly extended position. An operation device moves the ejecting plate in the PC card withdrawal direction through the link member when the push rod is moved from the extended position to the pushed-in position by the urging force from the outer end section, and latches the push rod to a retained position somewhat more on an outer side than the pushed-in position when the urging force is released with the push rod set in the pushed-in position. Further, it unlatches the push rod so as to be returned to the extended position when the push rod set in the retained position receives the urging force through the outer end section. The operation device including a movable actuator member which is disposed at the inner end section of the push rod so as to be abutted against the projection of the link member it moves along a movement direction of the push rod together with the inner end section while linearly moving along a direction substantially orthogonal to the movement direction of the push rod. There is also a cam for operating the actuator member. The cam has a drive section for moving the actuator member so that the actuator member is supported by the inner end section in an movement direction of the push rod on at least two positions and abuts against the projection of the link member when the push rod is moved from the extended position to the pushed-in position. A latching section is included for latching the actuator member to a position incapable of abutting against the projection of the link member and for latching the push rod to the retained position while preventing the push rod from being returned to the extended position when the push rod is situated in the pushed-in position and the urging force is release. A return section unlatches the actuator member and guides it toward the drive section while returning the push rod to the extended position when the push rod in the retained position receives the urging force through the outer end section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, servo to explain the principles of the invention.

FIG. 4 is an explanatory view showing a state in which the card connector shown in FIG. 1 is mounted onto a printed circuit board;

FIG. 5 is a plan view showing a link member and an ejecting plate of an ejecting mechanism which are attached to a header section of the card connector shown in FIG. 1;

DETAILED DESCRIPTION OF THE PREFERRED EMBODIMENTS

Figure 1:
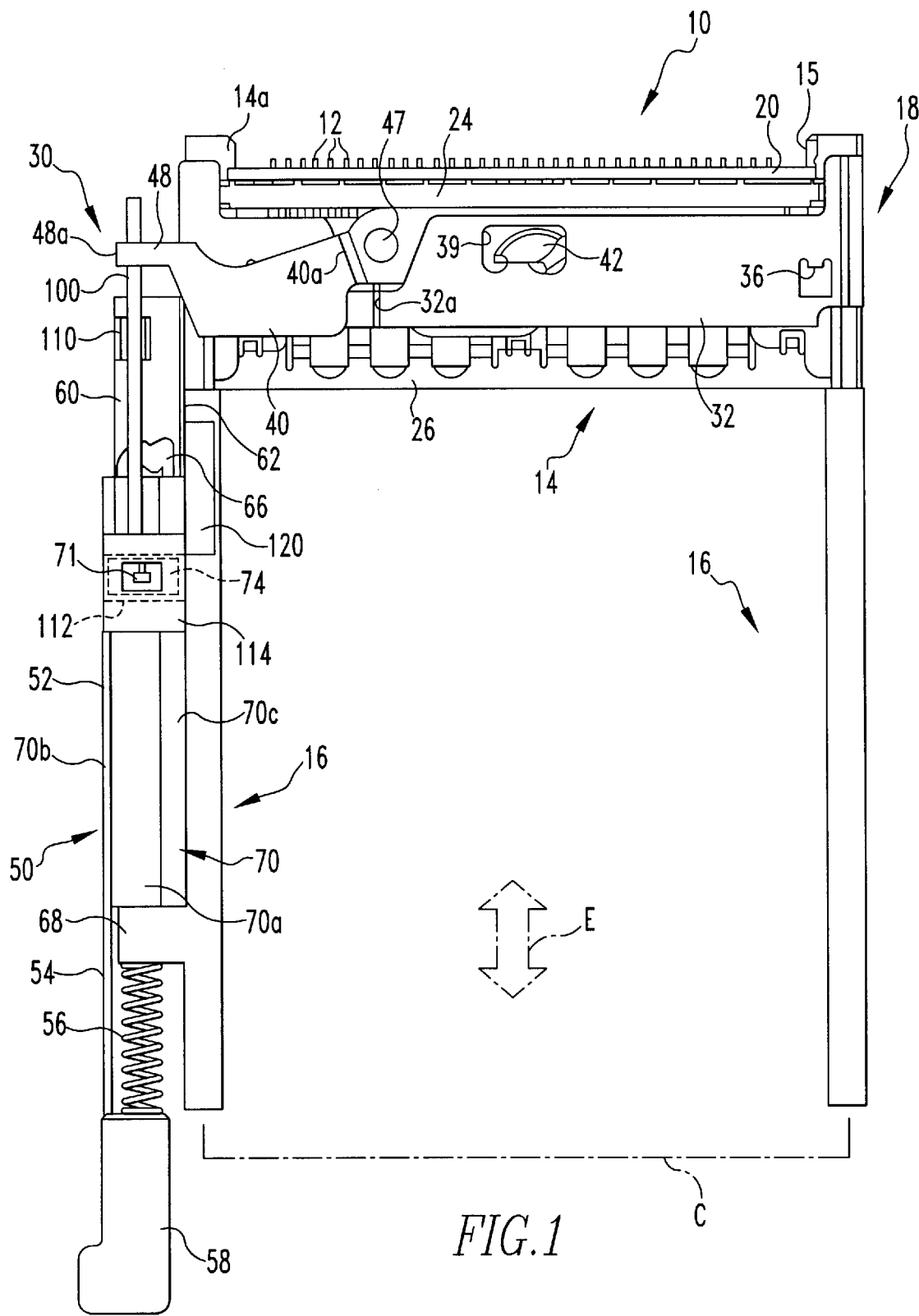
FIG. 1 is a plan view of a card connector according to one embodiment of the present invention.

A preferred embodiment of the present invention will be explained below in detail with reference to the accompanying drawings. FIG. 1 to FIG. 8 show a card connector 10 according to one embodiment of the present invention. As shown in FIG. 1, the card connector 10 of the present embodiment includes a connector frame 18 which is provided with a header section 14 having a plurality of terminal pins 12 arranged in a width direction and adapted to be connected to a PC card C, and a pair of opposed arm sections 16, 16 extending outwardly from both side ends of the header section 14.

The header section 14 has two header bodies 14a which are formed into the same structure made of an insulating material and are arranged so as to be stacked in a thickness direction of a PC card C (see FIG. 4). These header bodies 14a each have forward end sides of the terminal pins 12 inserted via through holes 28 (see FIG. 4) in a small printed circuit board 20 and soldered to the through holes. Further, the rear end sides of the header bodies 14a are integrally coupled by the arm sections 16 at both side ends. Namely, two header bodies 14a, 14a provide a rigid integral structure together with the small printed circuit 20 and the paired arm sections 16. Protrusions 21 (see FIG. 4) projecting from both side ends of the small printed circuit board 20 functions as a guide along a projection (see FIG. 1) formed in the header body 14a so that header bodies 14a, 14a mutually stacked are retained at a predetermined interval. Moreover, when the small printed circuit board 20 is perfectly mounted to the header body 14a, it is retained at a predetermined position because the protrusion 21 engages with a small projection (not shown) formed in the projection 15. Also, two metal-plate arms (not shown) which extend substantially parallel are projected from the forward end side of the arm section 16. And then, these arms are inserted into a substantially rectangular opening 96 (see FIG. 4) at the end portions of the respective header body 14a, and by doing so, two header bodies 14a, 14a mutually stacked are coupled on the opposite side of the small printed circuit board 20.

The respective arm sections 16 have mutually the same structure, and are arranged in their guide grooves 22 (see FIG. 4) in an opposed relation. PC cards C of various kinds of thickness have their side edge portions guided in guide grooves 22, and can be moved along an insertion/withdrawal direction E.

In the FIGS. 1–4, a reference numeral 24 denotes a shield plate, and 26 denotes a card bus shield in contact with the surface of the PC card C in which case ground pins projected at a predetermined interval are inserted through the through holes in the small printed circuit board 20 and soldered thereto.

An ejecting mechanism 30 for withdrawing the PC card C from the header section 14 has an ejecting plate 32 formed of a thin metal plate to and a link member 40.

The ejecting plate 32 is mounted so as to be slidable in both side edge portions of the header body 14a. In the present embodiment, in particular, the ejecting plate 32 is guided along the insertion/withdrawal direction E of the PC card C so that a hooklike claw section formed on its both side edge portions are fitted in the guide groove formed in the side edge portion of the header body 14a.

As shown in FIG. 4, the ejecting plate 32 is formed so as to have a stepped structure at its hole area. From the ejecting plate portion at each side of a step section 32a, a pair of engaging sections 36 is projected toward the header body 14a side so as to be set in engagement with the end face of the PC card C. Near to each side edge of the ejecting plate 32, the engaging sections 36 are formed so as to be bent from the plate material of the ejecting plate 32, and when the ejecting plate 32 is mounted on the header body 14a, are received in a corresponding receiving groove 38 formed in the header body 14a. Near to the step section 32a of the ejecting plate 32, a recess 32b for preventing an interference with a link member 40 is provided. Further, at a substantially middle of the ejecting plate 32, a substantially rectangular opening 39 is formed so as to allow a swingable motion of the link member 40.

The link member 40 is made of a thin metal plate, and has a stepped structure oppositely facing the ejecting plate 32. In the neighborhood of a step section 40a of the link member 40, a recess 40b is formed so as to engage with the step section 32a of the ejecting plate 32 and to prevent an interference with the ejecting plate 32. In the present embodiment, when step sections 40a and 32a are received in the associated recesses 32b and 40b, these plate portions on both the sides of the step sections 40b and 32b are overlapped in a substantially parallel state.

A projection 42 is projected from a portion of the link member 40 disposed between the ejecting plate 32 and the header body 14a. Further, at the forward end portion of the link member, an engaging section 44 (see FIG. 4) is provided so as to be projected on the header body 14a side opposite to the projection 42 side. The projection 42 is received in the opening 39 in the ejecting plate 32 and provides a coupling section swingably connected to the link member 40. The projection 42 is formed so as to have a curved outer peripheral surface to be abutted against the inner edge of the opening 39. It is, therefore, possible to smoothly transmit a force between the ejecting plate 32 and the link member 40. Also, when the ejecting plate 32 is moved, via the coupling section, in the withdrawal direction, the engaging section 44 is moved more outwardly than the engaging section 36 of the ejecting plate 32, so that the PC card C is ejected to a greater distance.

An opening 46 is formed as a support section near the step portion 40a of the link member 40. A support shaft section 47 is projected via the opening 46 from the header body 14a and supported so as to be swingable. Also, a convexly curved section may be provided at the edge portion of the forward end side section instead of forming the opening 46 in the link member 40, so that the convexly curved section is supported to allow it to be swingable by a wall portion made erect from the header body 14a. In this case, the support shaft section is unnecessary.

Figure 6:
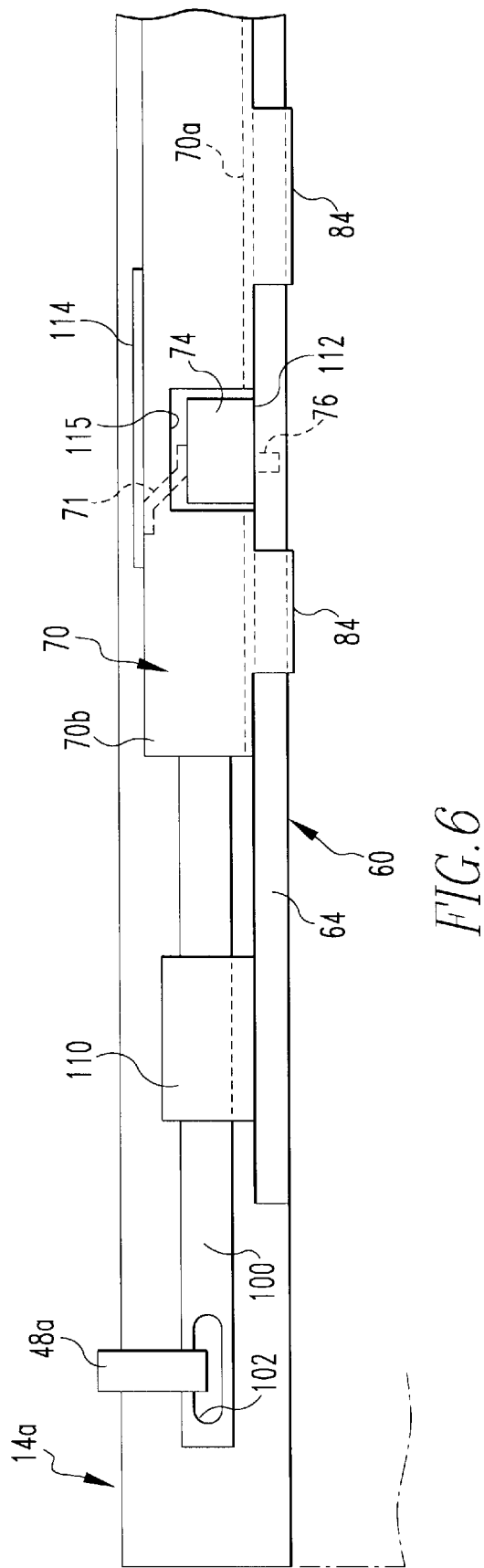
FIG. 6 is a side view of the ejecting mechanism as seen from A direction in FIG. 1.

The end side of the link member 40 is provided with a projection section. The projection section has a projection 48 which is projected outwardly of the header body 14a, and a first push rod extension 100 which is attached to the projection 48 and extends along the arm section 16. More specifically, as shown in FIG. 4 and FIG. 6, the end side of the projection 48 is formed with a hook section 48a which is bent like a hook. The hook section 48a engages with a slot 102 formed in the end side of the first push rod 100.

The ejecting mechanism 30 has a second push rod 50 which drives the first push rod extension 100 attached to the link member 40. The second push rod 50 comprises an inner end section 52 having an actuator member 74 abutting against the end side of the first push rod extension 100, an operation arm 54 extending outwardly from the inner end section 52, and a coil spring 56 for outwardly urging the second push rod 50. Also, the operation arm 54 is attached with a push button 58 at its outer end.

Even if the PC card is set in the connector 10, the push button 58 is arranged in the same position as in a case where the PC card is not inserted, and an operation device is provided in the ejecting mechanism 30 so that the push button 58 is projected outwardly only when the PC card C is withdrawn.

The operation device comprises the inner end section 52 of the second push rod 50 and a side projection 60 present on the arm section 16. The side projection 60 has a guide groove 62 provided as a guide rail on the arm section 16 side and a side edge section 64 present on an opposite side of the guide groove 62, and guides the inner end section 52 of the second push rod 50 along these parallel guide rails 62, 64.

Figure 3:
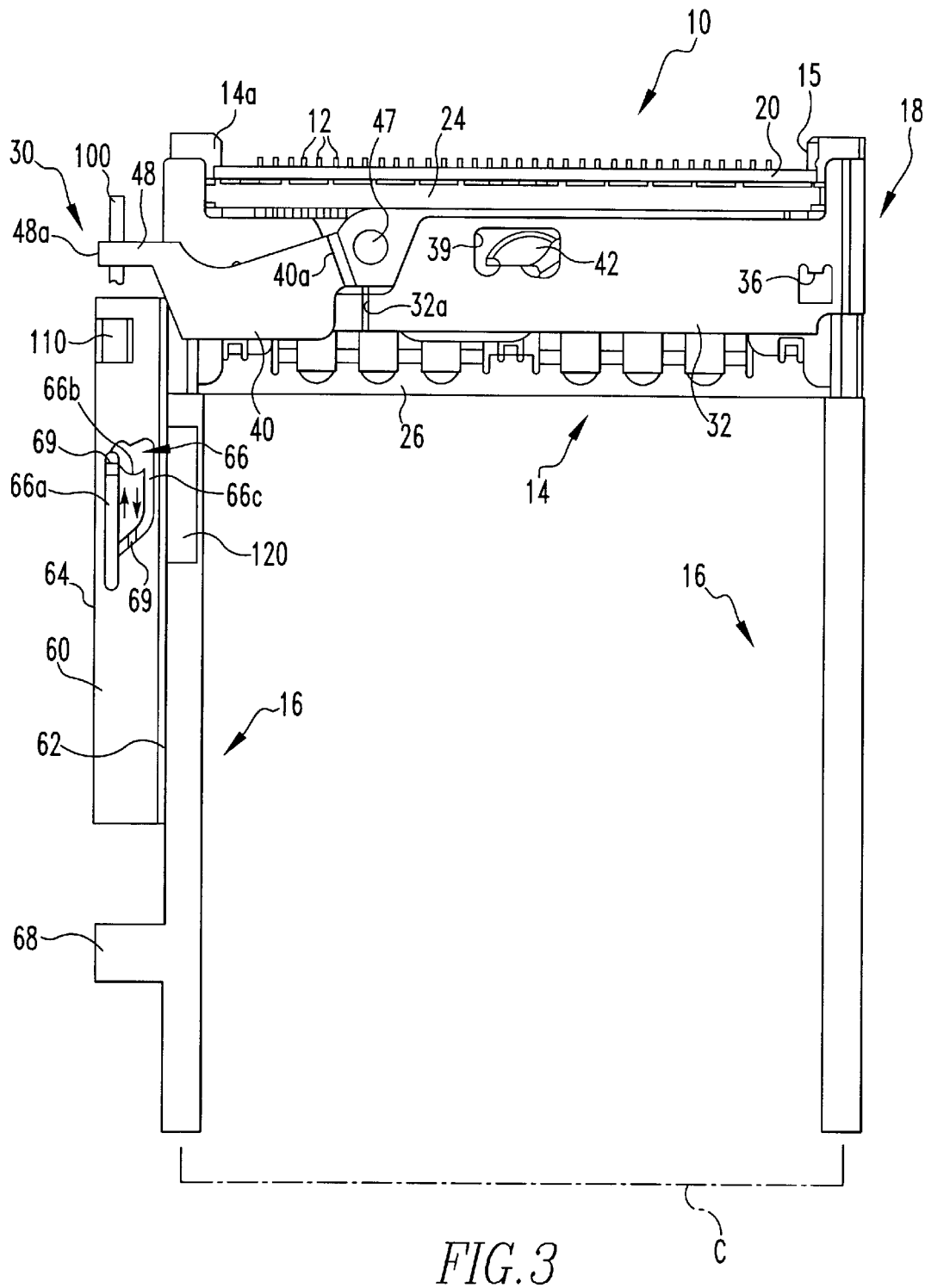
FIG. 3 is a plan view of the card connector shown in FIG. 1, showing a state in which the second push rod is removed from the card connector.

Further, as clearly shown in FIG. 3, the side projection 60 includes a cam groove 66 which guides the actuator member 74 of the inner end section 52 in its upper surface side. Also, the side projection 60 is provided with a guide member 110 which supports the first push rod extension 100 from below and has a concave cross section.

Figure 2:
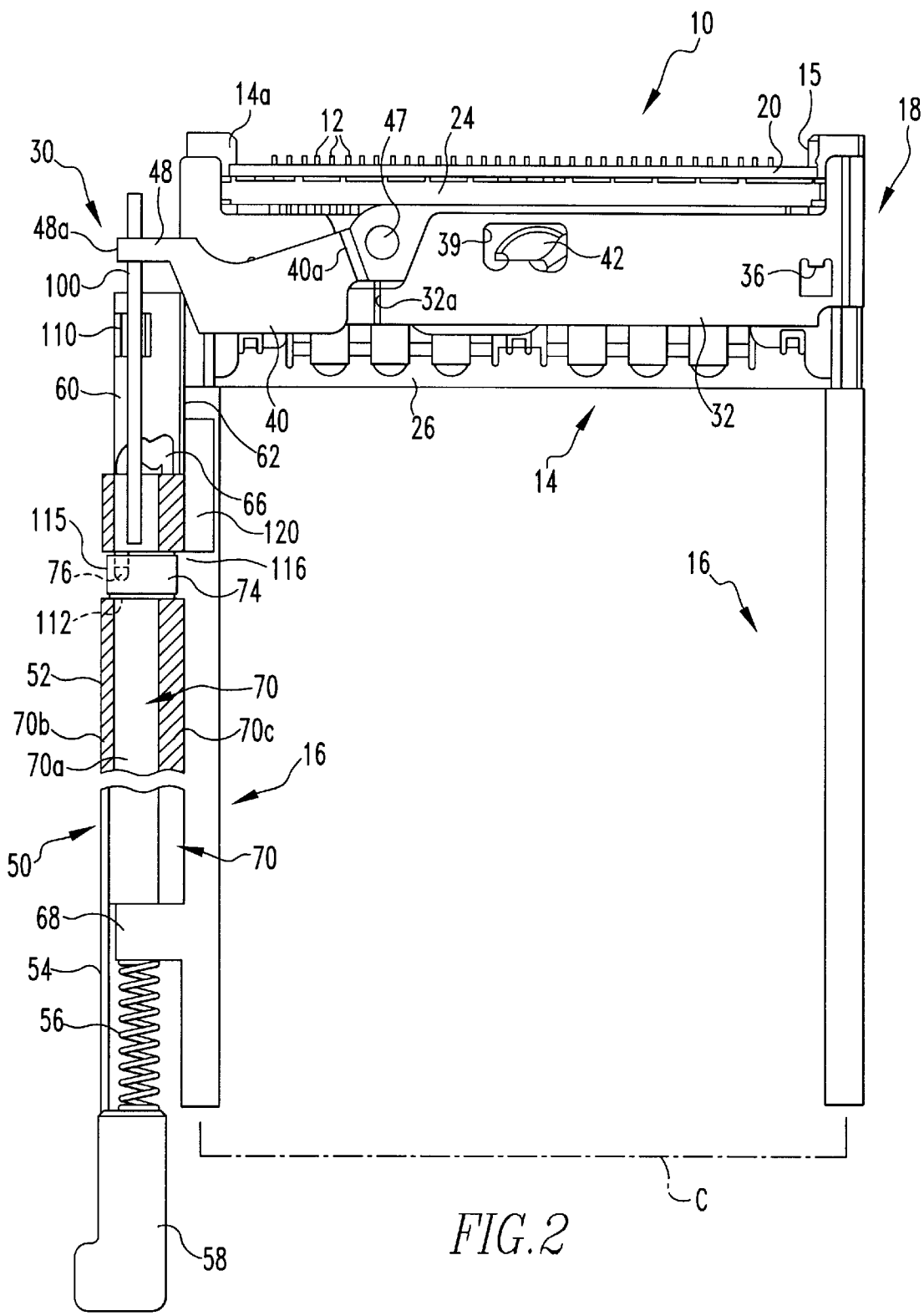
FIG. 2 is a plan view of the card connector shown in FIG. 1, partly in cross section showing a second push rod.
Figure 7:
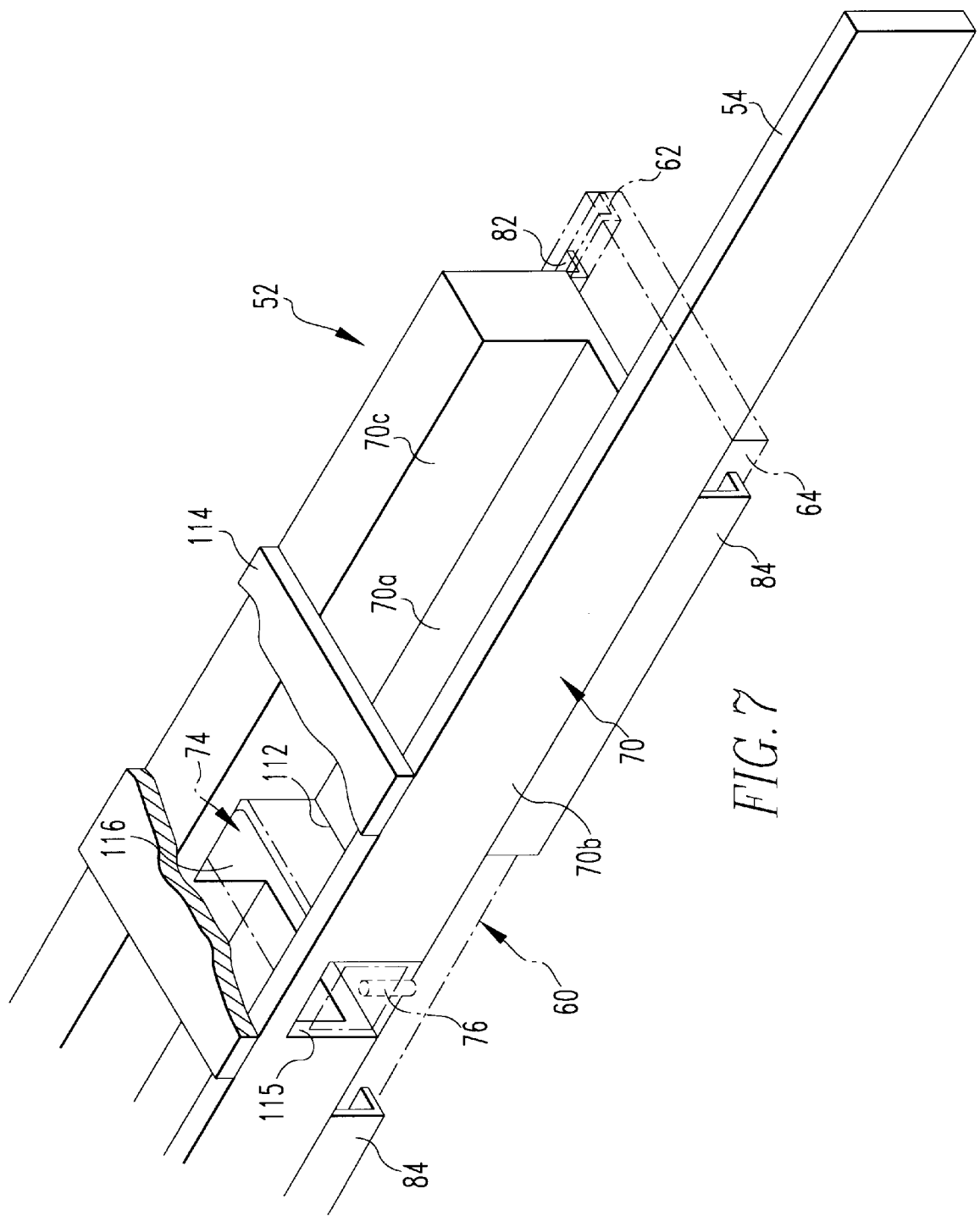
FIG. 7 is a perspective view showing principal parts of the second push rod.

As shown in FIG. 7 in detail, the inner end section 52 of the push rod 50 has a slider 70 which is slidable along guide rails 62, 64 and has a concave cross section, and an actuator member 74 which is mounted in the slider 70. Thus, when the push button 58 is inwardly pushed, the slider 70 slides on the side projection 60 along guide rails 62, 64 via the operation arm 54. Namely the push rod 50 slides along the arm section 16. Also, as shown in FIGS. 1 to 3, the outer side end of the arm section 16 is provided with a stopper 68 which supports the coil spring 56 and latches the inner end section 52 (slider 70) against an urging force of the coil spring 56. Movement of the push rod 50 is previously limited, and it is desirable to provide a stopper for preventing an unreasonable force to the actuator member 74 of the inner end section 52.

As shown in FIG. 6 and FIG. 7, in particular, a bottom wall 70a of the slider 70 is formed with an opening 112 which extends along a width direction of the slider 70. The actuator member 74 having a cam follower pin 76 engaging with the cam groove 66 is received in the opening 112 so as to be slidable. Specifically, the actuator member 74 is slidable in the opening 112 along the width direction of the slider 70. Also, side walls 70b, 70c of the slider 70 on both side of the opening 112 are formed with openings 115, 116 which allow the actuator member 74 to be projected thereto. Further, the actuator member 74 is urged toward the side projection 60 by means of a spring 71 fixed on a cover plate 114 covering the upper side of the actuator member 74. Thus, when the slider 70 is moved, the cam follower pin 76 also slides along the bottom wall of the cam groove 66. In this case, preferably, the slider is formed by bending a metal sheet. The slider 70 has a slide edge section 82 which is loosely fitted in the guide rail, that is, the guide groove 62 is on the header body 14a side. A slide edge section 84 also loosely sandwiches the guide rail, that is, the side edge section 64 is between the bottom wall 70a and the edge section, on the opposite side. As shown in FIG. 1 to FIG. 3, the arm section 16 is formed with a groove 120 which allows the actuator member 74 to be projected toward the arm section 16 side through the opening 116, and releases the actuator member 74 from a movement path of the first push rod extension 100.

As shown in FIG. 3 in detail, the cam groove 66 is formed as a continuous groove configuration, and comprises a drive section 66a which linearly extends along the longitudinal direction of the side projection 60, a latching section 66b which is situated on the small printed circuit board 20 side, and a curved return section 66c which extends from the latching section 66b toward the opposite side of the small printed circuit board 20. The cam follower pin 76 of the actuator member 74 is moved in the cam groove 66 along an arrow direction together with the movement of the push rod 50. An inclination section 69 is provided at a transition area from the drive section 66a to the latching section 66b and at a transition area from the return section 66c to the drive section 66a so as to prevent the cam follower pin 76 from being moved in a direction opposite to the arrow direction. Thus, the cam follower pin 76 is fully prevented from being moved from the drive section 66a to the return section 66c and from latching section 66b to the drive section 66a.

Next, referring now to FIG. 8, the following is an explanation about an operation of the card connector 10 having the aforesaid construction.

Figure 8D:
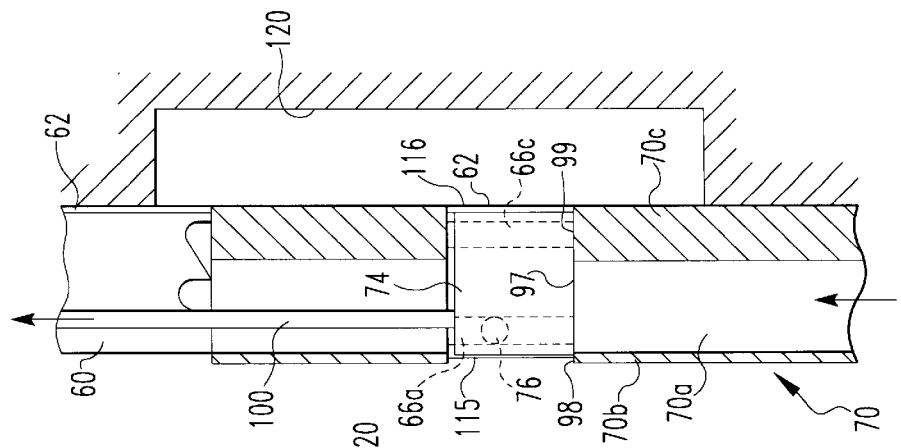
FIGS. 8(a–d) is a cross sectional view stepwise showing an operation of the second push rod.
Figure 8C:
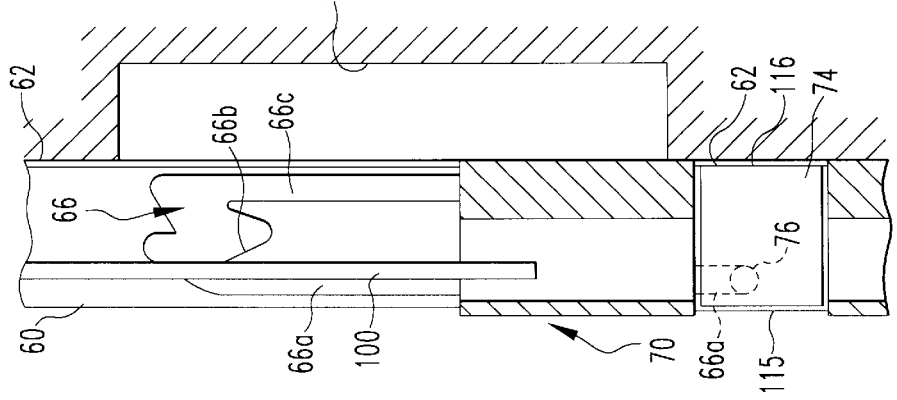
Figure 8B:
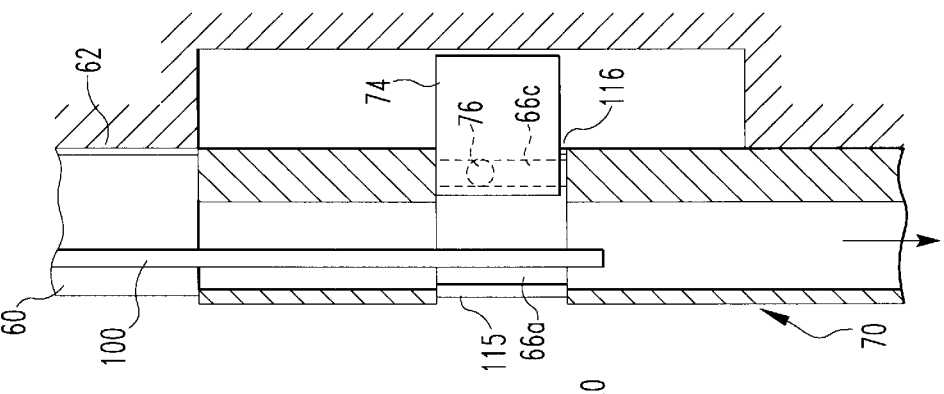
Figure 8A:
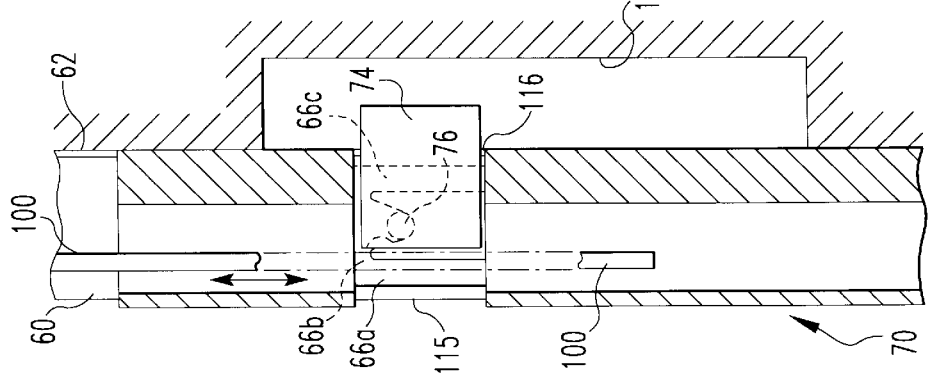

As shown in FIG. 8(a), the cam follower pin 76 of the actuator member 74 is normally situated at the latching section 66b of the cam groove 66. On the other hand, part of the actuator member 74 is projected into the groove 120 from an opening 116 of the slider 70. In this state, the second push rod 50 is situated in a retained position, and the actuator member 74 is retained in a position where it is retracted by means of the push button 58 attached to the outer end of the push rod 50. Further, in such a state, the first push rod extension 100 attached to the link member 40 is freely moved longitudinally in the slider 70 without interfering with the actuator member 74. Namely the link member 40 and the ejecting plate 32 can be freely moved. Therefore, when the PC card C is inserted into the card connector 10, the PC card C enables the link member 40 to swing while pressing the engaging section 36 of the ejecting plate 32 (moving outwardly the first push rod extension 100), and sets in fitting contact with the terminal pins 12.

When the push button 58 is lightly pushed in order to withdraw the PC card C out of the card connector 10, the cam follower pin 76 of the actuator member 74 is pushed out of the latching section 66b, and is moved outwardly in the return section 66c by an urging force of the coil spring 56 acting on the push rod 50 (see FIG. 8(b)). Thereafter, the cam follower pin 76 is guided into the drive section 66a through the return section 66c, and then, situated on the outermost end of the drive section 66a at the time the slider 70 latches the stopper 68. This state is shown in FIG. 8(c).

At this time, the push button 58 is situated in a position largely extended in a direction away from the header section 14. And the actuator member is fully received in slider 70.

When the push button 58 is pushed in the state shown in FIG. 8(c), the cam follower pin 76 is guided along the drive section 66a of the cam groove 66, and then, the actuator member 74 moves the first push rod extension 100 inwardly. At this time, the actuator member 74 pushes the first push rod 100 which is supported by an end face of the slider 70. The rear end face of the slider 70 is formed by the opening 112. That is, an end face 97 of the bottom wall 70a and end faces 98 and 99 of the side walls 70b, 70c (which is a configuration supported at two positions by, that is, end faces 98 and 99 of the side walls 70b, 70c which depend upon the height of the cam follower 76. Therefore, a push force of the first push rod extension 100 is directly received by these end faces from the front, so that an excessive force can be prevented from being applied to the cam groove 66 and the cam follower pin 76, etc.

When the push rod extension 100 is moved inwardly as described above, that is, the projection 48 of the link member 40 is moved by means of the actuator member 74, the link member 40 is swung around the support shaft section 47, and then, the ejecting plate 32 is moved outwardly. Thus, the PC card C has its inner end latched by the engaging section 36 of the ejecting plate 32, and then, is pushed outwardly together with the ejecting plate 32. And when the push rod 50 is fully pushed to a pushed-in position, the engaging section 44 provided on the forward end of the link member 40 further pushes the PC card C outwardly after the PC card C has been disconnected away from the terminal pins 12.

When a push force of the push button 58 is released in a state in which the push rod 50 is fully pushed to a pushed-in position, the cam follower pin 76 is set at the latching section 66b under the urging force of the coil spring 56. Thus, part of the actuator member 74 is projected into the groove 120 from the opening 116 of the slider 70, and then, is away from the movement path of the first push rod extension 100. Also, the push rod 50 is again held at the retaining position. In this retaining position, the push button 58 is located somewhat more on an outer side than in a fully pushed-in position.

As described above, according to the present embodiment, the card connector 10 is provided with the actuator member 74 which linearly moves in the opening 112 of the slider 70 along the width direction of the slider 70. The actuator member 74 is supported by at least two positions on end faces along a slide direction of the slider 70 while a push rod extension 100 being bushed to a pushed-in position by means of the actuator member 74, and thus, the ejecting mechanism 30 is operated. In other words, the push force of the first push rod extension 100 acts on the end face of the slider 70 in the slide direction. Therefore, an unreasonable force is not biasedly applied to component parts when the PC card C is withdrawn therefrom, so that a force transmission can be preferably performed.

Moreover, in the present embodiment, when the PC card C is withdrawn out of the card connector, the actuator member 74 provided on the push rod 50 is guided along the cam groove 66 while being linearly operated, and the link member 40 is operated by means of the first push rod extension 100 which is pushed in by the actuator member 74, thus the ejecting plate 32 being operated. Therefore, there is provided the ejecting mechanism-equipped card connector which enables the push button 58 to project only when the PC card C is withdrawn out of the card connector, and also, the card connector can be cheaply manufactured with a very high operation reliability and a simple structure.

Further, in the present embodiment, the first push rod extension 100 is moved by the second push rod 50 to operate the ejecting mechanism 30. It may of course be any other structure so long as the push force of the second push rod 50 acts on the link member 40. Specifically, the projection section provided on the end side of the link member 40 is not limited to the projection 48 and the push rod extension 100 attached to the projection 48. For example, an extended section extending integrally from the link member 40 may be used so as to abut against the second push rod 50. Also, any force transmission mechanism may be provided so as to apply the push force of the second push rod 50 to the link member 40.

Furthermore, in the present embodiment, the cam groove 66 is provided on the upper surface of the side protrusion 60, and the slider 70 slides along the upper surface of the side projection 60. This embodiment is specially limited to the above description. For example, the construction may be made in a manner that the cam groove 66 is provided on the side surface of the side protrusion 60, and the slider 70 slides vertically along the side surface of the side projection 60 so as to move the first push rod extension 100.

As is evident from the above description, the card connector of the present invention can be cheaply manufactured with a simple structure without applying an excessive force to component parts.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A PC card connector equipped with an ejecting mechanism, comprising:
   a connector frame having a header section having an array of plural terminal pins, and a pair of opposed arm sections extending from both side ends of the header section and guiding the side edge of a PC card along an insertion/withdrawal direction of the PC card;

an ejecting plate having engaging sections for engaging with the PC card and guided along an insertion/withdrawal direction of the PC card;

a link member having a coupling section coupled to the ejecting plate so as to be swingable, a support section swingably supported at the header section in spaced-apart position from the coupling section, and projection extending from the support section toward an opposite side of the coupling section and projecting into the side of the connector frame;

a push rod having an inner end section disposed adjacent to the header section side of the connector frame and an outer end section spaced apart from the header section and adapted to receive an urging force, and being moved from an outwardly extended position spaced apart from the header section to an inwardly pushed-in position near the header section;

urging means for urging the push rod toward the outwardly extended position; and an operation device which moves the ejecting plate in the PC card withdrawal direction through the link member when the push rod is moved from the outwardly extended position to the pushed-in position by the urging force from the outer end section, and latches the push rod to a retained position more on an outer side than the pushed-in position when the urging force is released with the push rod set in the pushed-in position, and further, unlatches the push rod so as to be returned to the outwardly extended position when the push rod set in the retained position receives the urging force through the outer end section;

the operation device including a movable actuator member which is disposed at the inner end section of the push rod so as to be abutted against the projection of the link member and moves along a movement direction of the push rod together with the inner end section while linearly moving along a direction substantially orthogonal to the movement direction of the push rod, and a cam for operating the actuator member, the cam having a drive section for moving the actuator member so that the actuator member is supported by the inner end section in a movement direction of the push rod on at least two positions and abuts against the projection of the link member when the push rod is moved from the extended position to the pushed-in position, a latching section for latching the actuator member to a position incapable of abutting against the projection of the link member and for latching the push rod to the retained position while preventing the push rod from being returned to the extended position when the push rod is situated in the pushed-in position and the urging force is released, and a return section for unlatching the actuator member and guiding it toward the drive section while returning the push rod to the extended position when the push rod in the retained position receives the urging force through the outer end section.

2. The card connector according to claim 1, wherein the connector frame has a side projection which is situated on the side where the projection of the link member projects so as to form the cam and a guide rail which is provided in the side projection and guides the inner end section of the push rod along an insertion/withdrawal direction of the PC card, the inner end section of the push rod is provided with a slider which slides along the guide rail and has a concave cross section, and the actuator member is arranged so as to be mounted in an opening provided in a bottom wall of the slider and to overlap with the cam.

3. The card connector according to claim 2, wherein the push rod has an operation arm coupled to one end of the slider and receiving an urging force of the urging means, and an outer end of the operation arm receives a push force.

4. The card connector according to claim 2, wherein the cam has a groove in the side projection, and the actuator member has a cam follower pin guided along the groove which is spring-urged toward the side projection, and the cam follower pin is et in contact with the bottom wall of the groove.

5. The card connector according to claim 1 wherein there is a push rod extension which connects the actuator member of the push rod with the projection of the link member.

6. The card connector according to claim 4, wherein the connector frame has a side projection which is situated on the side where the projection of the link member projects so as to form the cam and a guide rail which is provided in the side projection and guides the inner end section of the push rod along an insertion/withdrawal direction of the PC card, the inner end section of the push rod is provided with a slider which slides along the guide rail and has a concave cross section, and the actuator member is arranged so as to be mounted in an opening provided in a bottom wall of the slider and to overlap with the cam.

7. The card connector according to claim 6, wherein the push rod has an operation arm coupled to one end of the slider and receiving an urging force of the urging means, and an outer end of the operation arm receives a push force.

8. The card connector according to claim 6, wherein the cam has a groove in the side projection, and the actuator member has a cam follower pin guided along the groove which is spring-urged toward the side projection, and the cam follower pin is set in contact with the bottom wall of the groove.

* * * * *